United States Patent Office 3,216,975
Patented Nov. 9, 1965

3,216,975
ELASTOMERS DERIVED FROM HYDRAZINO
COMPOUNDS OF CYCLIC DIAZINES
Joachim Kunde, Frankenthal, Pfalz, and Robert Gehm and Hermann Weissauer, Ludwigshafen, Rhine, and Gerhard Wellenreuther, Limburgerhof, Pfalz, Germany, assignors to Badische Anilin- & Soda-Fabrik Aktiengesellschaft, Ludwigshafen, Germany
No Drawing. Filed Dec. 3, 1964, Ser. No. 415,794
Claims priority, application Germany, Dec. 6, 1963,
B 74,558
1 Claim. (Cl. 260—77.5)

This invention relates to a process for the production of highly elastic molded articles based on polyurethanes, in which process isocyanate-modified polyhydroxy compounds are reacted with hydrazino compounds of cyclic diazines.

It is known that it is possible, by the reaction of isocyanate-modified polyhydroxy compounds with diamines or hydrazine in solution, to produce polymers that may be processed into elastic films or fibers having good performance characteristics. Because of the great speed of the reaction, such processes are difficult to carry out.

It is also known that in the production of such highly elastic molded articles there may be used, instead of diamines, the less reactive dihydrazides or cyanuric hydrazides. However, polyurethanes obtained in this way are difficult to dye with acid dyes.

We have now found that the production of highly elastic molded articles by the reaction, in solution, of substantially linear isocyanate-modified polyhydroxy compounds having molecular weights of about 750 to about 6,000 and terminal isocyanate groups with chain-length increasers having at least two reactive hydrogen atoms and subsequent molding while removing the solvent by heating, may be advantageously carried out by using, as chain-length increasers having two reactive hydrogen atoms, hydrazino compounds of cyclic diazines.

Examples of such compounds are dihydrazino derivatives of o-, m- and p-diazines, such as phthalazines, pyrimidine, quinazolines and quinoxalines.

The class of the dihydrazino-m-diazines, for example, has the formula

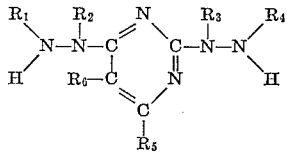

where each of $R_1$, $R_2$, $R_3$, $R_4$, $R_5$ and $R_6$ denotes hydrogen, an alkyl group having preferably 1 to 4 carbon atoms, e.g. methyl, ethyl or propyl; an aralkyl or aryl group, such as benzyl or phenyl, or, in the case of $R_5$ and/or $R_6$, halogen, preferably chlorine or bromine. In the case of quinazoline $R_5$ and $R_6$ are components of the aromatic ring which in its turn may bear alkyl groups or halogen atoms as substituents.

Examples of particularly suitable compounds are 2,4-dihydrazino-6-phenyl-m-diazine:

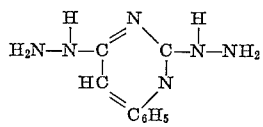

2,4-dihydrazino-6-methyl-m-diazine, 2,4-dihydrazino-5,6-tetramethylene-m-diazine, 2,4-dihydrazino-6-benzyl-m-diazine, 2,4-dihydrazino-5-methyl-6-phenyl-m-diazine, 2,4-dihydrazinoquinazoline, 2,3-dihydrazinoquinoxaline and 1,4-dihydrazinophthalazine.

Compounds of the said type may be prepared by the process described in Bull. France 1959, pages 1793 to 1798.

The elastic high polymers prepared using the new chain-length increasers are distinguished by the fact that they are more basic than conventional elastomers in the production of which diamines, hydrazines, dicarboxylic hydrazides, or dihydrazides of s-triazine (cyanuric hydrazides) are used as chain-length increasers. This has the special advantage that the new high polymers are easier to dye with acid dyes than the corresponding conventional high polymers. Fibers made from the new polymers may therefore be dyed either as such or, in special cases, in the form of union fabrics. On the other hand, these new polymers are not so basic that they cause irritation to the human skin when in contact with it, as is to be feared when a large number of tertiary basic amino groups are present. Moreover, the basicity of the dihydrazinodiazines is not so high as to have an undesirable catalytic influence on the condensation of the isocyanate-modified polyhydroxy compounds with the new chain-length increasers.

The reaction of the isocyanate-modified polyhydroxy compounds with the dihydrazinodiazines is carried out advantageously in inert polar solvents, such as dimethyl formamide, dimethyl acetamide, tetramethylenesulfone or tetramethylurea. These solvents may also be used in admixture with one another or with other, less polar solvents, such as tetrahydrofuran or dioxane.

In the process according to this invention, up to about 10 wt. percent solutions of the said dihydrazinodiazines, which may be heated, are advantageously introduced with vigorous stirring into about 10 to 60 wt. percent solutions of isocyanate-modified polyhydroxy compounds, which preferably are at about room temperature. It is also possible to place the solution of the dihydrazinodiazine in a vessel and to add to it the solution of the isocyanate-modified polyhydroxy compound. The solution of the isocyanate-modified polyhydroxy compound and that of the dihydrazinodiazine may be mixed by conventional mixing means, e.g. by nozzles. Immediately on mixing the solutions there are formed solutions of low to high viscosity depending on the solids content. Conventional additives, such as fillers, pigments, dyes or stabilizers, may be added to the solutions prior to molding. The solutions are then made into molded articles in conventional manner. Films are produced for example by applying the solutions onto plates or endless belts and removing the solvent, and filaments by spinning the solutions by conventional dry or wet spinning methods. The filaments are highly elastic and are particularly suitable for textile materials, such as corsetry, sportswear and medical articles.

Highly elastic coatings may be obtained for example by immersing the articles in question in solutions containing the polymer, taking them out of the solution and removing the solvent.

Examples of suitable polyhydroxy compounds having terminal hydroxyl groups and which are reacted with diisocyanates to isocyanate-modified polyhydroxy compounds in known manner, are conventional polyethers, polythioethers, polyesters or polyacetals with terminal hydroxyl groups and such molecular weights that the isocyanate-modified polyhydroxy compounds have molecular weights of about 750 to about 6,000 and a melting point below 50° C. Examples of such hydroxyl-containing polyethers and polythioethers are polymers of ethylene oxide, propylene oxide or tetrahydrofuran, their copolymers, or their addition products with polyols, such as glycol, butanediol and the polymers of thiodiglycols. Suitable polyesters may for example be prepared from dicarboxylic acids usually used for this purpose, such as adipic, azelaic, sebacic and decanedicarboxylic acids, straight-chain and branched diols, such as ethylene glycol, butanediol-1,4, hexanediol-1,6, propylene glycol-1,2, butanediol-1,2, butanediol-2,3, 2,2-dimethylpropanediol-1,3, hexanediol-2,5, 2,2-dimethylhexanediol-1,3, the proportions of straight-chain compounds and compounds that are branched or cause branching in the polyester chain being advantageously so selected that the polyester formed has a melting point below 50° C. Suitable polyacetals may for example be prepared from polyhydric alcohols and aliphatic aldehydes, e.g. from formaldehyde or p-formaldehyde and hexanediol, methylhexanediol, heptanediol, octanediol or cyclic acetals, such as butanediol formal. The said polyhydroxy compounds advantageously have 2 terminal hydroxyl groups and may be obtained by conventional methods. Their preparation is not an object of the present invention.

To prepare the isocyanate-modified polyhydroxy compounds, the polyethers, polythioethers, polyesters and polyacetals may be reacted with the diisocyanates either alone or in admixture in conventional manner. Polyhydroxy compounds having molecular weights of about 1,000 may first be converted into higher-molecular-weight polyhydroxy compounds using a deficiency of diisocyanate; the latter are then modified with a further amount of diisocyanate.

The conventional reaction of substantially bifunctional polyhydroxy compounds with diisocyanates is advantageously carried out in a molar ratio of 1:2 at temperatures between 80 and 120° C. during a period of one to two hours. To obtain special-grade products having different elasticity, higher or lower molar ratios may be used. The polyhydroxy compounds may be reacted with diisocyanates either in the absence or presence of conventional inert solvents, such as methylene chloride or benzene. However, in the case of isocyanate-modified polyhydroxy compounds prepared in the presence of apolar solvents it is advantageous to remove the solvent before using the compounds.

Particularly suitable isocyanates are aromatic diisocyanates, such as 1,4-phenylene diisocyanate, 4,4'-diphenyl diisocyanate, 4,4'-diphenylmethane diisocyanate, 1,5-naphthylene diisocyanate or toluylene diisocyanate. Aliphatic diisocyanates, such as hexamethylene diisocyanate or diisocyanates which may be prepared by partial or total hydrogenation of the aromatic diisocyanates mentioned above, are also suitable.

The invention is further illustrated by the following examples in which parts are by weight.

Example 1

200 parts of a copolyester (molecular weight 2,000) of ethylene glycol, butanediol-1,4 (molar ratio 1.5:1) and adipic acid is mixed while excluding humidity, with 50 parts of 4,4'-diphenylmethane diisocyanate for two hours at 100° C. with stirring, the reaction vessel being rinsed with nitrogen. After cooling, the isocyanate content of the mixture is 3.31%. The mixture is diluted with 250 parts of dimethyl formamide; then a solution of 21 parts of 2,4-dihydrazino-6-phenylpyrimidine in 2,180 parts of dimethyl formamide is added. A viscous solution is formed instantaneously. The polymer solution is poured onto a glass sheet in a layer 3 mm. thick and the solvent evaporated. A highly elastic film is obtained.

Example 2

200 parts of a copolyester (molecular weight 2,000) derived from adipic acid, hexanediol-1,6 and butanediol-1,3 (molar ratio of the diols 2:1) is reacted with 50 parts of 4,4'-diphenylmethane diisocyanate at 100° C. for two hours with mixing. The isocyanate content of the reaction product is 3.42%. The reaction product is diluted with 250 parts of dimethyl formamide; then a solution of 19 parts of dihydrazinoquinazoline in 2,170 parts of dimethyl formamide is added with vigorous stirring, the viscosity of the solution being markedly increased. Films prepared from this solution are slightly yellow in color, highly elastic and have good strength.

Example 3

100 parts of a copolyester (molecular weight 2,000) derived from adipic acid, glycol and propylene glycol (molar ratio of the diols 1:1) are modified with 25 parts of 4,4'-dihpenylmethane diisocyanate in the way indicated in Example 1. The isocyanate content is 3.29%. The solution is diluted with 125 parts of dimethyl formamide; then a solution of 9.5 parts of dihydrazinoquinoxaline in 1,085 parts of dimethyl formamide, which solution has first been heated to 60° C. to dissolve the chain-length increaser and then cooled to 20° C., is added with vigorous stirring. Highly elastic films may be prepared from this solution by the method indicated in Example 1.

Example 4

110 parts of a hydroxyl-containing copolyether (molecular weight 2,200) derived from tetrahydrofuran and propylene oxide (molar ratio of the ethers about 10:1) is reacted with 25 parts of 4,4'-diphenylmethane diisocyanate under the conditions set forth in Example 1. The reaction product, whose isocyanate content is 3.09%, is diluted with 135 parts of dimethyl formamide. The resultant solution of the reaction product is intensively mixed with a solution of 9.7 parts of 2,4-dihydrazino-5,6-tetramethylenepyrimidine in 1,165 parts of dimethyl formamide. The solution obtained may be made into elastic films and coatings.

Example 5

100 parts of a copolyester (molecular weight 2,000) derived from adipic acid, hexanediol-1,6 and butylene glycol-1,3 (molar ratio of the glycols 1:1) is modified with 25 parts of 4,4'-diphenylmethane diisocyanate. The reaction product, whose isocyanate content is 3.24%, is diluted with 125 parts of dimethyl formamide and mixed with a solution, heated to about 50° C., of 13 parts of 2,4-dihydrazino-6,7-dichloroquinazoline in 1,120 parts of dimethyl formamide. The solution obtained may be made into highly elastic films and coatings.

We claim:

A process for the production of highly elastic molded articles which comprises reacting, in an inert polar solvent solution, (a) an isocyanate-modified polymer having the molecular weight of from about 750 to about 6,000 and prepared by reacting one mol of a substantially bifunctional polyhydroxy compound having terminal hydroxy groups, said polyhydroxy compound being selected from the group consisting of polyethers, polythioethers, polyesters, and polyacetals, with at least two mols of an organic diisocyanate, the —N=C=O radicals of said diisocyanate reacting with said terminal hydroxyl groups of said polyhydroxy compound, with (b) a dihydrazino compound of a cyclic diazine selected from the group consisting of phthalazine, pyrimidine, quinazoline and quinoxaline, said dihydrazino compound having at least two reactive hydrogen atoms, and molding the resultant solution while heating.

References Cited by the Examiner

UNITED STATES PATENTS

| | | | |
|---|---|---|---|
| 3,004,945 | 10/61 | Farago | 260—77.5 |
| 3,149,998 | 9/64 | Thurmaier | 260—77.5 |

LEON J. BERCOVITZ, *Primary Examiner.*